Nov. 3, 1959  E. KODRA ET AL  2,911,271

PISTON ASSEMBLY

Filed April 15, 1957

INVENTORS:
ESPER KODRA
EUGENE J. DOPERALSKI

BY *Charles F. Osgood,*

ATTORNEY

United States Patent Office 2,911,271
Patented Nov. 3, 1959

2,911,271
PISTON ASSEMBLY

Esper Kodra and Eugene J. Doperalski, Michigan City, Ind., assignors to Joy Manufacturing Company, Pittsburgh, Pa., a corporation of Pennsylvania Application April 15, 1957, Serial No. 652,728

11 Claims. (Cl. 309—29)

Our invention relates to a packed piston assembly and more particularly to a packed piston assembly having ring segments which are biased and guided outwardly by means of a novel plunger expander.

At the present time numerous industrial applications require compressed air which is free of hydrocarbons for various well known reasons. In order to meet these requirements it has been common practice to employ a plurality of partially overlapping carbon packing segments which are disposed to extend outwardly around a compressor piston and engage the sides of a compressor cylinder. Such a segmental carbon packing or as more commonly known, carbon piston ring eleminates the need for lubricating the compressor cylinder. It has also been common practice to provide one or more means spaced inwardly of the cylinder wall and engageable with one or more of the ring segments to bias each of the ring segments radially outwardly into engagement with the sides of the compressor cylinder.

Prior piston assemblies for such purposes have been of a structure to permit movement of the various individual segments with respect to each other which causes the segments to wear unevenly and results in gaps being formed between the individual segments. As can be appreciated, gaps between ring segments are particularly undesirable in that they reduce the compressor efficiency and cause breakage of the rings. Such problems are particularly acute with reference to non-vertical piston assemblies where additional gravitational forces are involved so that wedging of the segments with respect to each other may occur. Prior attempts to bias the individual segments of the piston ring outwardly have employed elongated spring expanders of various configurations which are made of hardened steel or an alloy thereof. In view of the relative hardness of such expanders and the aluminum pistons, which are normally employed in compressors for these purposes, considerable wear results in the ring grooves of the pistons so as to substantially decrease the piston life. In many styles of flat spring piston expanders highly stressed regions are employed such that the life of the expanders is quite short and, in many instances, breakage occurs at a highly stressed region so that the broken ends of the expanders may move out of the piston grooves and cause damage to the cylinder, the piston or the valves. Another problem with such prior flat spring expanders is that upon breaking away of the carbon rings the expanders may become exposed and cause damage to the cylinder sidewalls.

Accordingly, one object of our invention is to provide a new and improved means for both guiding and biasing a piston ring segment outwardly from the piston.

Another object of our invention is to provide a new and improved piston ring segment biasing means having at least an outer surface thereon of a material having a friction characteristic so as not to cause damage to the piston cylinder in the event of engagement therewith.

A further object of our invention is to provide a new and improved piston ring biasing means having enlarged outer ends closely received in a similarly shaped recess of the piston ring segment.

A specific object of our invention is to provide a new and improved piston ring biasing means having a hollow sleeve portion one end of which is closed and in which a coil spring is located.

A more specific object of our invention is to provide a new and improved piston ring biasing means having a tubular steel portion one end of which is closed and in which a coil spring is located for biasing the plunger outwardly of the piston and which plunger has an enlarged head closely received in a similar shaped recess in the piston ring segment.

Still another object of our invention is to provide a new and improved piston ring biasing means which is coated with a low friction material relative to the material which the piston ring engages.

Still another object of our invention is to provide a new and improved piston segment biasing means which is slidably received within sleeve means extending outwardly of the piston.

These and other objects of our invention will become more apparent when taken in conjunction with the following detailed description of preferred embodiments thereof and the following drawings, in which.

Figure 1:
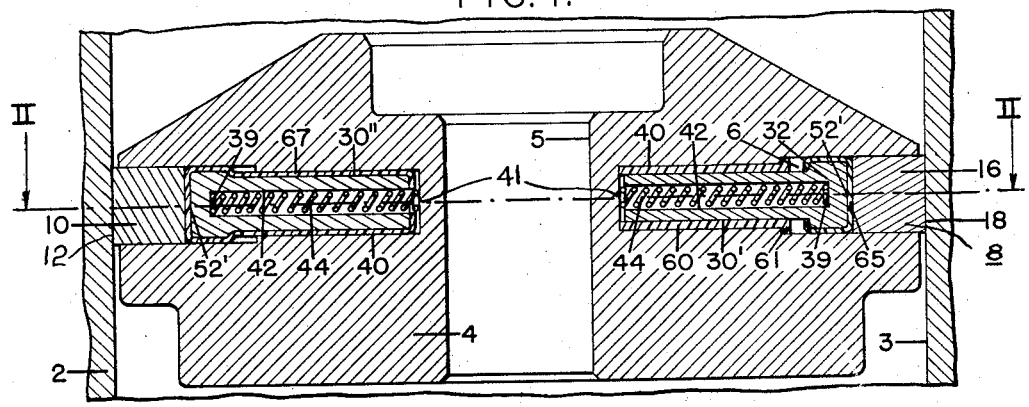
Figure 1 is a cross sectional view of a portion of a conventional compressor cylinder having a piston mounted therein which piston has piston ring segments biased outwardly by means of plunger expanders constructed in accordance with the principles of our invention.

Referring to the drawings it will be noted that a conventional compressor cylinder 2 is shown in part having an inner bore 3 in which a suitable generally cylindrical piston 4 is received. As shown, the piston 4 is provided with a central bore 5 to facilitate connecting the piston 4 in any suitable manner to suitable reciprocating means whereby the piston 4 reciprocates within the cylinder 2. The piston 4 is also provided with a circumference groove 6 having generally parallel sides and in which a suitable hollow packing means, such as a carbon segment piston ring 8, is located to extend circumferentially around the piston 4 and to circumferentially engage the bore 3 of the cylinder 2. Inasmuch as such pistons 4, cylinders 2 and the mounting thereof are well known in the art further description and illustration thereof are not believed to be necessary. Further, although only one groove 6 and piston ring 8 are shown, it is to be realized that a plurality of axially spaced grooves 6 and piston rings 8 may be provided if desired.

Piston rings such as the piston ring 8 are commonly formed from a plurality of carbon block segments which are of an axial thickness to be closely received between the parallel sides of the groove 6 and of a radial thickness to have the inner surface spaced adjacent the botto 7 of the groove 6 and to have the outer circumference engage the bore 3 of the cylinder 2. It will be appreciated that, as the ring 8 is biased radially outwardly by plunger expanders as hereinafter described, the inner circumference of the piston ring 8 will be moved radially outwardly from the bottom 7 of the groove 6 due to the wearing away of the outer circumference of the piston ring 8 as it reciprocates within the cylinder 2. The ring 8 may be formed from various numbers of carbon segments of various configurations as are well known in the art in order to obtain the desired cooperation therebetween.

For the purpose only of illustrating our invention, a six-piece ring 8 is shown having three identical circumferentially spaced elongated carbon block segments 10 each of which has an outer arcuate surface 12 engageable with the bore 3 of the cylinder 2. The ends of the arcuate surface 12 are connected together by means of a chordal surface 14. Three identical wedge shaped circumferentially spaced carbon block segments 16 are also provided, each of which have an outer arcuate surface 18 engageable with the bore 3 of the cylinder 2 and an inner arcuate surface 22 which is of a greater length than the surface 18. The arcuate surfaces 18 and 22 are joined together by means of elongated side surfaces 24 on the segments 16 which extend convergently outwardly of the cylinder 2. As shown, the wedge segments 16 are circumferentially spaced about the piston 4 to be alternately disposed between the segments 10, respectively, with the elongated side surfaces 24 engaging the chordal surfaces 14 of the spaced segments 10. It will be noted that the arcuate surfaces 22 are of a length so that the ends thereof are spaced from the ends of the other surfaces 22 on the spaced wedge segments 16 whereby a central portion of the chordal surface 14 of each segment 10 is located adjacent the bottom 7 of the grooves 6. With such structure an interlocking action is obtained between the engaged surfaces 24 and 14 so that the segments 10 and 16 may be retained in engagement with each other as the segments are moved radially outwardly of the piston 4 as is well known in the art.

Figure 2:
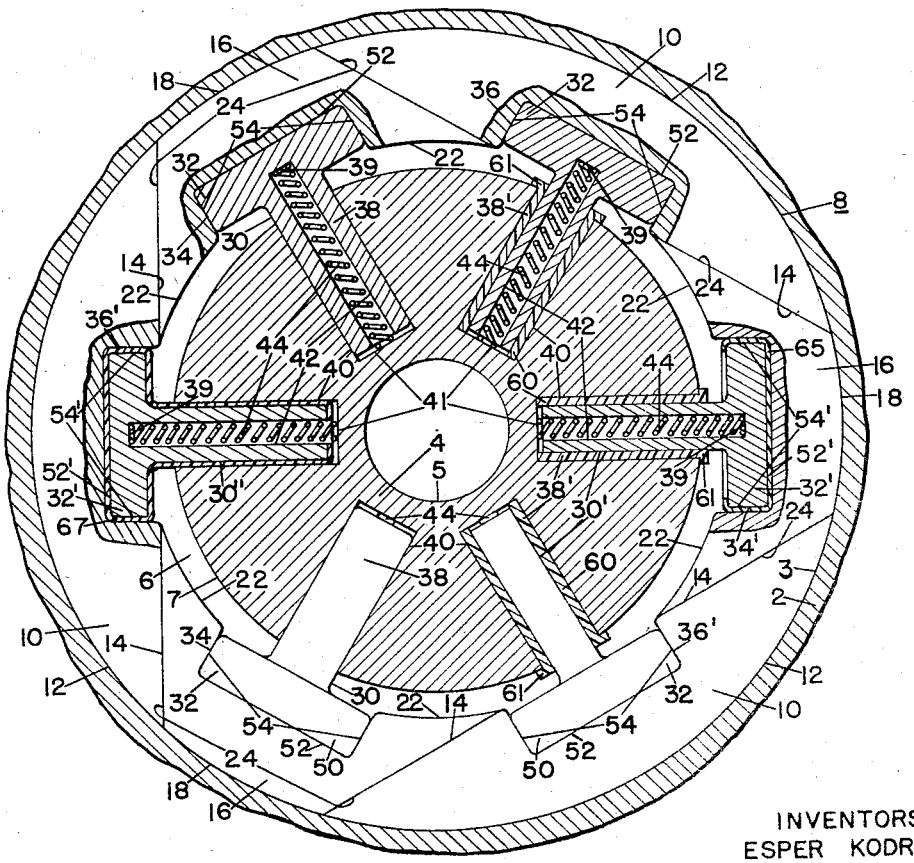
Figure 2 is a top plan view of a piston assembly as shown in Figure 1 taken substantially along the lines II—II thereof.

Referring to Figure 2, each of the segments 10 and 16 is cooperable with a generally T-shaped plunger expander to both guide and bias the segments 10 and 16 radially outwardly from the piston 4. As shown, one embodiment of our piston expander 30 comprises a rectangular head portion 32 which is closely received in a parallel sided groove 34 in the cooperable wedge segment 16 which extends outwardly from the surface 22 and between the sides of the groove 6. Similarly, the segments 10 are also cooperable with a head portion 32 and are provided with a groove 36 which extends outwardly from the chordal surface 14 into the segment 10 and between the sides of the groove 6. Each piston expander 30 includes an elongated cylindrical stem portion 38 which extends outwardly from the head portion 32 and is slidably received in one of a plurality of arcuately spaced circular openings 40 which extend radially into the piston 4 from the bottom 7 of the groove 6 and which openings 40 terminate in a flat bottom land 41. Each stem portion 38 is provided with an elongated central opening 42 which extends from the free end thereof to a flat bottom land 39 adjacent the outer side of the head portion 32.

In order to bias the piston expanders 30 radially outwardly of the piston 4, an elongated coil spring 44 is located in each opening 42 to extend between the lands 39 and 41. In order to accomplish such purpose it is to be realized that the spring 44 must be compressed when the stem portion 38 is initially inserted within the opening 40 and be expandable radially outwardly for the full radial outward movement of the piston expander 30. Also in order to permit the piston expander 30 to move radially outwardly of the piston 4, it will be obvious that a circular stem portion 38 and opening 40 are not essential and that any suitable configurations therefor may be employed to obtain sliding movement therebetween.

As shown, the head portion 32 is rectangular with the elongated sides 50 thereof being closely received between the parallel sides of the groove 6 and with the outer surface 52 and end surfaces 54 thereof engaging the bottom and end surfaces of the grooves 34 and 36 of the segments 10 and 16, respectively, in which it is located. Due to engagement of such surfaces on the rectangular head portion 32 with the ends of groove 34 and sides of the groove 6 any substantial movement other than radial between the segments 10 and 16 and their cooperable head portion 32 is prevented. Further, in order to prevent any bending moments between components the radial axes of the springs 44, stem portions 38, head portions 32 and the cooperable segment 10 or 16 are coincident. It will also be noted that the outer surface 52 of the head 32 is spaced radially inwardly from the bore 3 of the cylinder 2, a distance less than the length of the stem portion 38. Thus, in the event the head portion 32 engages the bore 3 of the cylinder 2, due to breakage or wear of the segments 10 or 16, the stem portion 38 is retained in the opening 40 so that the spring 44 cannot break loose to cause damage to the bore 3 of the cylinder 2. Accordingly the spring 44 may be formed from any suitable material having sufficient mechanical strength and resiliency and is preferably formed from a chrome plated steel or a stainless steel in order to be corrosion resistant.

In such compressors it is customary to form the piston 4 from an alloy of aluminum and accordingly if desired, in order to facilitate sliding movement and prevent wear between the stem portion 38 of the plunger expander and the sides of the openings 40, an elongated tubular bearing sleeve 60 may be inserted in the opening 40. With such construction, stem portion 38' is of smaller diameter than the stem portion 38, previously described, is employed. The sleeves 60 may be formed from any suitable material such as nylon to provide a low friction slide fit with the outer surface of the stem 38. Also, if desired, the sleeves 60 may be provided with a radially outwardly extending flange 61 engageable with the bottom 7 of the groove 6 to facilitate their removal.

In order to prevent any damage from occurring to the bore 3 of the cylinder 2 in the event the segments 10 or 16 break or wear away, the piston expanders 30 are preferably formed from a material having a low coefficient of friction with respect to the material from which the cylinder 2 is formed. Such cylinders 2 are generally formed from a ferrous material such as an iron casting alloy and, accordingly, the piston expanders 30 may be formed from various materials having a lower coefficient of friction such as bronze or nylon which may be formed in any suitable manner such as by being machined or molded. Thus, in the event of such engagement the bore 3 will not be scored due to the fact that the lower friction material will wear away first. It will be noted, however, that only the outer surfaces 52 of the head 32 will engage the bore 3 of the cylinder 2 due to the heretofore described retention of the stem portion 38 within the opening 40. Accordingly, if desired, a material, such as nylon, may be coated on or applied to the outer surfaces 52' and 54' of the head portion 32' in any suitable manner to provide a piston expander 30' having a low friction coating 65 on its outer end. With such structure enlarged grooves 34' and 36' similar to the grooves 34 and 36 or a smaller head portion 32' similar to the head portion 32 are provided to accommodate the additional material of the coating 65. Or, if desired, a piston expander 30" may be provided with a low friction coating 67, such as nylon applied to its entire outer surface. The coating 67 also eliminates the need for bearing sleeves 60. Also, either of such coated structures permits various materials to be used for the plunger expander as only the friction characteristics of the coatings 65 or 67 are utilized. Thus, it will be noted that we have provided various structures, in which damage to the cylinder 2 is prevented and in which the ring segments are guided radially outwardly.

Having described preferred embodiments of our invention in accordance with the patent statutes, it is to be realized that modifications thereof may be made without departing from the broad spirit of our invention. Accordingly, it is respectfully requested that our invention be interpreted as broadly as possible and as limited only by the prior art.

What we claim is:

1. A piston assembly comprising, a piston having a groove extending around its outer periphery in which an expandable piston ring is located, an elongated opening extending from the bottom of said groove inwardly of said piston, said ring having an opening extending partially therethrough and outwardly from the inner surface thereof in alignment with said opening in said piston, a plunger having a stem portion closely slidably received in said opening in said piston for guided outward movement and a head portion closely received in said opening in said ring, and means located in said opening in said piston and engaging said plunger for biasing said head portion of said plunger into engagement with the bottom of said opening in said ring.

2. A piston assembly comprising, a piston having a groove extending around its outer periphery in which an expandable piston ring is located, an elongated opening extending from the bottom of said groove inwardly of said piston, said ring having an opening extending partially therethrough and outwardly from the inner surface thereof in alignment with said opening in said piston, an elongated hollow bearing located within and engageable with the side of said opening in said piston, a plunger having a stem portion closely slidably received within said bearing for guided outward movement and a head portion closely received in said opening in said ring, and means located in said bearing and engaging said plunger for biasing said head portion of said plunger into engagement with the bottom of said opening in said ring.

3. A piston assembly comprising, a piston having a groove extending around its outer periphery in which an expandable piston ring is located, an elongated opening extending from the bottom of said groove inwardly of said piston, said ring having an open ended groove extending between the sides of said ring and partially therethrough and outwardly from the inner surface thereof in alignment with said opening in said piston, a plunger having a stem portion closely slidably received in said opening in said piston for guided outward movement and a head portion with opposed portions engaging the sides of said groove in said ring and with other opposed portions engaging the sides of said groove in said piston, and means located in said opening in said piston and engaging said plunger for biasing said head portion of said plunger into engagement with the bottom of said opening in said ring.

4. A piston assembly comprising, a piston having a groove extending around its outer periphery in which an expandable piston ring is located, an elongated opening extending from the bottom of said groove inwardly of said piston, said ring having an open ended rectangular groove extending between the sides of said ring and outwardly from the inner surface thereof in alignment with said opening in said piston, a plunger having a stem portion slidably received in said opening in said piston and a rectangular head portion extending outwardly from said stem portion with one pair of opposed sides engaging the sides of said rectangular groove and with the other pair of opposed sides engaging the sides of said groove in said piston, and means located in said opening in said piston for biasing said head portion of said plunger into engagement with the bottom of said groove in said ring.

5. A piston assembly comprising, a piston having a groove extending around its outer periphery in which an expandable piston ring is located, an elongated opening extending from the bottom of said groove inwardly of said piston, said ring having on open ended groove extending between the sides of said ring and outwardly from the inner surface thereof in alignment with said opening in said piston, a plunger having a stem portion slidably received in said opening in said piston and a head portion with opposed portions engaging the sides of said groove in said ring and with other opposed portions engaging the sides of said groove in said piston, said head portion of said plunger being coated with a material which is softer than the material from which said piston is formed, and means located in said opening in said piston for biasing said head portion of said plunger into engagement with the bottom of said opening in said ring.

6. A piston assembly comprising, a cylindrical piston having a circumferential groove extending radially inwardly from the outer surface thereof, a plurality of spaced openings extending radially inwardly of said piston from the bottom of said groove, a plurality of segmental sections disposed in said circumferential groove and in engagement with each other to form a hollow body with the inner surface spaced outwardly from the bottom of said circumferential groove, each of said sections having a groove therein extending radially partially therethrough and outwardly from said inner surface and between the sides of said circumferential groove, said grooves in said sections having a portion thereof in alignment with said openings in said piston, respectively, plunger expanders having head portions closely received between the sides of said grooves in said sections, respectively, said plunger expanders having stem portions closely slidably received in said openings, respectively, and means located in said opening engaging said plungers for biasing said plunger expanders radially outwardly of said piston respectively.

7. A piston assembly comprising, a piston having a groove extending around its outer periphery in which an expandable piston ring is located, an elongated opening extending from the bottom of said groove inwardly of said piston, said ring having an opening extending outwardly from the inner surface thereof in alignment with said opening in said piston, a coated plunger having a stem portion slidably received in said opening in said piston and a head portion closely received in said opening in said ring, said coating being of a material which is softer than said piston, and means located in said opening in said piston for biasing said head portion of said plunger into engagement with the bottom of said opening in said ring.

8. A piston assembly comprising, a cylindrical piston having a circumferential groove extending radially inwardly from the outer surface thereof, a plurality of spaced openings extending radially inwardly of said piston from the bottom of said groove, a plurality of segmental sections disposed in said circumferential groove and in engagement with each other to form a hollow body with the inner surface spaced outwardly from the bottom of said circumferential groove, each of said sections having a groove therein extending radially outwardly from said inner surface and between the sides of said circumferential groove, said grooves in said sections having a portion thereof in alignment with said openings in said piston, respectively, plunger expanders having head portions which are coated with a material softer than the material of said piston and which are closely received between the sides of said grooves in said sections, respectively, said plunger expanders having stem portions slidably received in said openings, respectively, and means located in said openings for biasing said plunger expanders radially outwardly of said piston.

9. A piston assembly comprising, a circular piston having a circumferential groove extending around its outer periphery in which an expandable multi-sectional piston ring is located, elongated openings extending from the bottom of said groove radially inwardly of said piston, each section of said ring having an open ended rectangular groove extending between the sides of said ring and outwardly from the inner surface thereof, said grooves in said ring being radially aligned with said openings in said piston, respectively, plungers having stem portions slidably received in said openings in said piston, respectively, said plungers having rectangular head portions extending outwardly from said stem portions with one pair of opposed sides engaging the sides of said rectangular grooves, respectively, said head portions having other pairs of opposed sides engaging the sides of said groove in said piston, and means located in said opening in said piston for biasing said head portion of said plunger into engagement with the bottom of said groove in said ring.

10. An expandable piston ring device comprising, an expandable hollow segmental ring member having an opening extending partially therethrough and outwardly from the inner surface thereof, a plunger having a head portion closely received in said opening in said hollow ring member, said plunger having integral means extending radially inwardly from said head for guiding said plunger for radial movement only, and means engaging said plunger for biasing said head portion of said plunger into engagement with the bottom of said opening in said hollow ring member.

11. A sealing ring device comprising, a hollow segmental ring member having an inner and outer surface with an opening extending partially therethrough and outwardly from one of said surfaces, a plunger having a head portion closely received in said opening in said hollow ring member, said plunger having integral means extending radially away from said one surface and said head for guiding said plunger for radial movement only, and means engaging said plunger for biasing said head portion of said plunger into engagement with the bottom of said opening in said hollow ring member.

References Cited in the file of this patent

UNITED STATES PATENTS

| | | |
|---|---|---|
| 920,237 | Allen | May 4, 1909 |
| 1,475,773 | Allen | Nov. 27, 1923 |
| 1,565,859 | Litter | Dec. 15, 1925 |
| 2,460,430 | Phillips | Feb. 1, 1949 |

FOREIGN PATENTS

| | | |
|---|---|---|
| 209,567 | Great Britain | Jan. 17, 1924 |